US008307426B2

(12) United States Patent
Thekkath

(10) Patent No.: US 8,307,426 B2
(45) Date of Patent: Nov. 6, 2012

(54) SYSTEMS AND METHODS FOR CONTROLLING THE USE OF PROCESSING ALGORITHMS, AND APPLICATIONS THEREOF

(75) Inventor: Radhika Thekkath, Palo Alto, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 1235 days.

(21) Appl. No.: 11/627,899

(22) Filed: Jan. 26, 2007

(65) Prior Publication Data

US 2008/0184361 A1 Jul. 31, 2008

(51) Int. Cl.
*G06F 7/04* (2006.01)
(52) U.S. Cl. ............ 726/21; 726/17; 726/2; 380/28; 709/223; 709/224; 709/225; 709/226
(58) Field of Classification Search .......... 380/44, 380/28, 21; 726/17; 709/223–226
See application file for complete search history.

(56) References Cited

U.S. PATENT DOCUMENTS

| 5,946,396 | A * | 8/1999 | Davis ........................ 713/178 |
| 6,959,256 | B2 * | 10/2005 | Basto ........................ 702/117 |
| 2003/0185391 | A1 * | 10/2003 | Qi et al. ........................ 380/44 |
| 2005/0021944 | A1 * | 1/2005 | Craft et al. ........................ 713/161 |
| 2007/0179904 | A1 * | 8/2007 | Hofstee et al. ........................ 705/67 |
| 2007/0209072 | A1 * | 9/2007 | Chen ........................ 726/16 |

OTHER PUBLICATIONS

Security Framework for MPLS and GMPLS Networks;L. Fang ;Jul. 1, 2010 ;Internet Engineering Task Force (IETF).*
Design and analysis of Network-on-Chip (NoC) architecture; Bahn, Jun Ho.;ProQuest Dissertations and Theses;2008. vol. 0544,1ss. 0030;p.n/a.*
"Cirrus Logic's New Maverick EP7312 Processor Enables Flexible On-Chip Security for Consumer Internet Products," Press Release, Cirrus Logic Inc,, Embedded Systems Conference, Sep. 25, 2000, San Jose, California, 4 pages, viewed at <http://www.cirrus.com/en/press/releases/P172.html>.
Wilson, R., "IP protects chips from unauthorized manufacture," EDN, Jul. 24, 2006, 2 pages, viewed at <http://www.edn.com/article/CA6355571.html>.

* cited by examiner

*Primary Examiner* — Taghi Arani
*Assistant Examiner* — Angela Holmes
(74) *Attorney, Agent, or Firm* — Sterne, Kessler, Goldstein & Fox, P.L.L.C.

(57) ABSTRACT

The present invention provides systems and methods for controlling the use of processing algorithms, and applications thereof. In an embodiment, authorization to use an algorithm is validated in a system having a processor capable of executing user defined instructions, by executing a user defined instruction that writes a first value to a first storage of a user defined instruction block, uses the first value to transform a second value located in a second storage of the user defined instruction block, and compares the transformed second value to a third value located in a third storage. Use of the algorithm is permitted only if the comparison of the transformed second value to the third value indicates that use of the algorithm is authorized. In another embodiment, authorization to use an at least partially decrypted algorithm is validated via a key for enablement.

10 Claims, 14 Drawing Sheets

MULTI-CORE

SINGLE CORE

SYSTEMS AND METHODS FOR CONTROLLING THE USE OF PROCESSING ALGORITHMS, AND APPLICATIONS THEREOF

FIELD OF THE INVENTION

The present invention generally relates to systems and methods for controlling the use of processing algorithms in processing systems, and applications thereof.

BACKGROUND OF THE INVENTION

Manufacturers of consumer electronics such as MP3 players, digital television systems, etc., and customers thereof, have differing needs when it comes to requirements for internal device control. Many of these systems can be run using the same basic processor core(s). However, depending on the functionality required by each particular product, manufacturer, or customer, many different combinations of functional algorithms such as, for example, audio algorithms are needed. Designing a custom system-on-chip (SoC) for each individual customer's product needs is expensive. In addition, if certain licensable algorithms are included in a worldwide product, customers in certain countries would be expected to pay royalties for those algorithms, even if those algorithms cannot run when the product is implemented in those countries.

What are needed are new systems and methods, for example, for SoC designs that overcome the above mentioned deficiencies.

BRIEF SUMMARY OF THE INVENTION

The present invention provides systems and methods for controlling the use of processing algorithms, and applications thereof. For example, in an embodiment, the present invention provides a system-on-chip (SoC) design and software platform that allows one or more processing algorithms, such as audio or video algorithms, to be enabled or disabled depending on the product, manufacturer and/or customer needs (e.g., depending on the world region in which the end user is located). Using the present invention, an SoC architecture provider and/or an SoC manufacturer, for example, can use fewer SoC designs (or even a single SoC design) containing many algorithms and authorize the use of selected algorithms according to the requirements of SoC customers. The advantages of such an invention include efficiency of design and lower cost in that the same SoC design can be used to meet the differing needs of various SoC customers. The present invention enables the guarding of algorithms, for example, that are not a part of a purchase agreement or that are not appropriate for the world region where the product is intended to be used.

In an embodiment, authorization to use an algorithm is validated in a system having a processor capable of executing user defined instructions. The validation is accomplished by executing at least one user defined instruction that writes a first value to a first storage of a user defined instruction block, uses the first value to transform a second value located in a second storage of the user defined instruction block, and compares the transformed second value to a third value located in a third storage. Use of the algorithm is permitted only if the comparison of the transformed second value to the third value indicates that use of the algorithm is authorized.

In one embodiment, the at least one user defined instruction is executed during initialization of the algorithm. In an alternative embodiment, the at least one user defined instruction is executed during a main computation period of the algorithm. In a third embodiment, the at least one user defined instruction is executed during initialization of the algorithm as well as during a main computation period of the algorithm.

In one embodiment, authorization to use an at least partially encrypted algorithm is validated via a key for enablement. In this embodiment, an encrypted portion of an algorithm is loaded into a memory location. The encrypted portion of the algorithm is decrypted within the memory location. When the decrypted portion of the algorithm is executed, an undocumented code is checked against a key located in an undocumented memory location in order to validate enablement of the algorithm. If enablement is validated, execution of the algorithm can continue. If enablement is not validated, execution of the algorithm is stopped. In one embodiment, the system is configured such that reading out of the memory location by a debugger program is not allowed.

In one embodiment, authorization to use an algorithm is validated by both a user-defined instruction as well as through partial encryption/decryption using a key for enablement. Using this combination provides an extra layer of algorithm protection.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention is described with reference to the accompanying drawings. The drawing in which an element first appears is typically indicated by the leftmost digit or digits in the corresponding reference number.

DETAILED DESCRIPTION OF THE INVENTION

The present invention provides systems and methods for controlling the use of processing algorithms, and applications thereof. In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The term "user defined instruction" (or "UDI") is used throughout the specification. As used in this document, a "user" is a logic designer that implements custom logic and instructions that are executable by the custom logic in conjunction with the processor when it is operated by an end user. Such logic and instructions are commonly employed to implement specific functionality in a minimum amount of hardware or software logic. A user defined instruction is not commonly part of a standard Instruction Set Architecture (ISA), but the ISA can provide opcode space allowing licensees of a synthesizable core, for example, to implement their own instructions as needed. A well-defined user defined instruction (UDI) block can provide not only the necessary opcode space but also the interfaces necessary to a processor core to create an efficient and seamless implementation of these special instructions. The instructions need not necessarily be user defined in some embodiments, but could rather be integrated into the Instruction Set Architecture (ISA) or extension thereof. Similarly, a "user defined instruction block" could be a standard intellectual property (IP) block that is not necessarily user defined.

Figure 1:
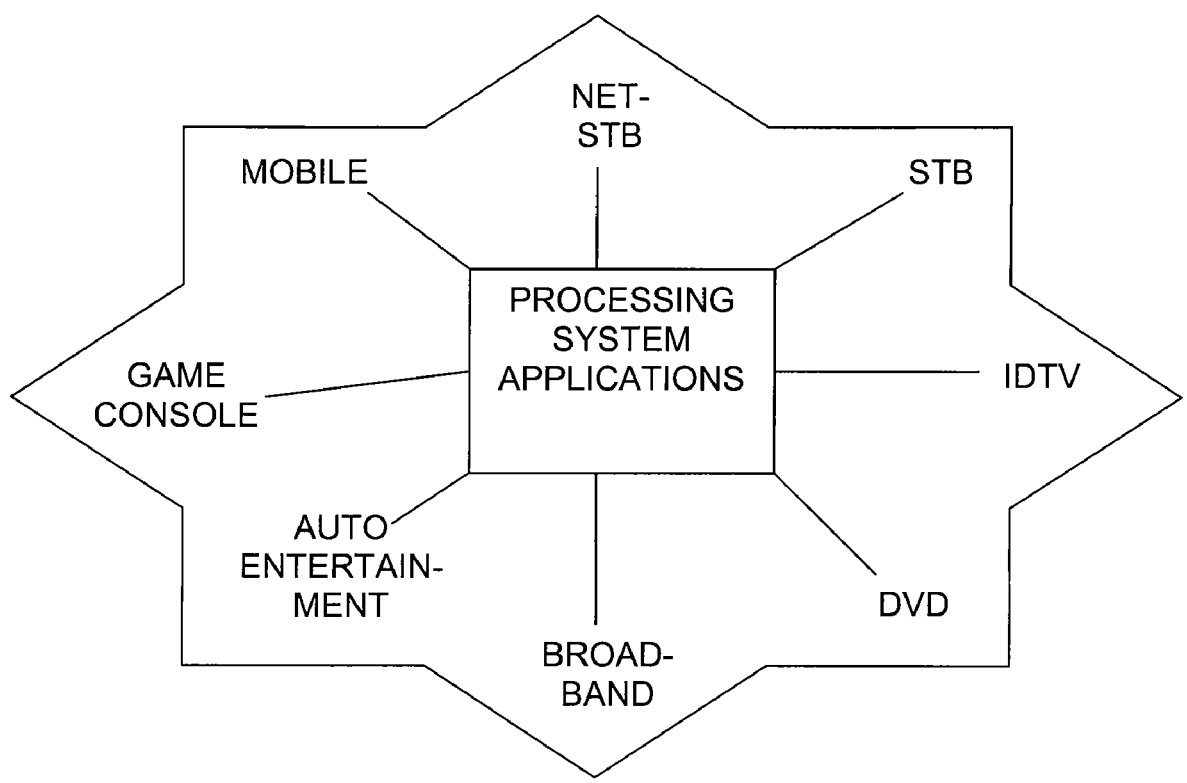
FIG. 1 is a diagram illustrating various applications in which the present invention can be used.

Processor cores in consumer devices are typically used as the host processor. For example, a processor core typically runs the operating system and other control applications. More recently, processor cores are running other functions as well. For example, audio functionality is becoming prominent in many consumer devices. Examples of consumer devices and technologies in which one or more processor cores can not only run the operating system and control applications, but can also run other functions, such as audio, include digital versatile disc (DVD) devices, broadband devices, automobile entertainment devices, game consoles, mobile telephones and related mobile devices, set top boxes (STB and/or Net-STB), and digital television (IDTV), as depicted in FIG. 1.

Figure 2:
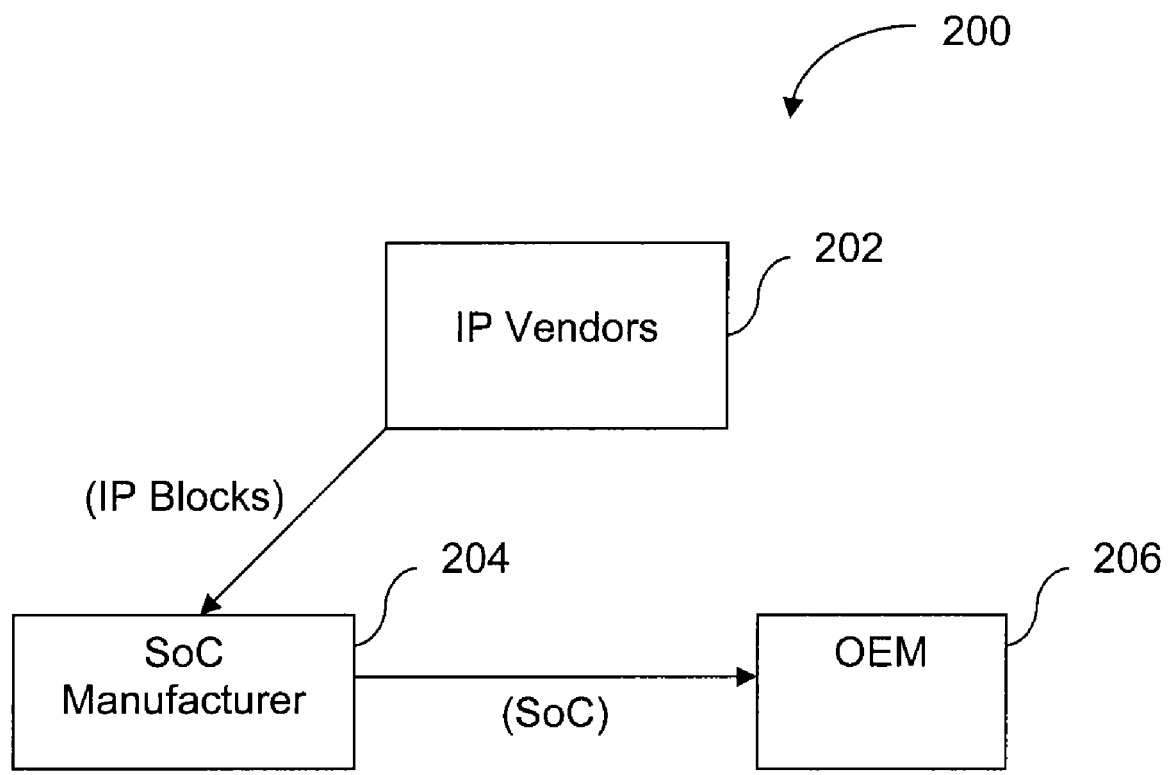
FIG. 2 is a diagram illustrating parties involved in the design, manufacture, and implementation of system-on-chip (SoC) products.

FIG. 2 is a diagram indicating the parties 200 involved in the design, manufacture, and implementation of a typical SoC. An SoC manufacturer obtains various intellectual property (IP) blocks from IP vendors, including the IP of the main controlling processors. The SoC manufacturer designs and manufacturers the SoC using these IP blocks. The SoC manufacturer 204 provides the manufactured SoC to an original equipment manufacturer (OEM) 206 such as, for example, the manufacturer of an MP3 player. Throughout this specification, the main processor IP vendor for the SoC is referred to as an SoC architecture provider.

As discussed herein, sometimes features are provided in an SoC that are to be used only by authorized SoC manufacturers 204 and/or authorized OEMs 206. In order to prevent the need for multiple SoC designs that include one or more of these special features, the present invention allows an SoC architecture provider 202 to include any or all of the special features in an SoC design with the design incorporating the capability of enabling or disabling one or more of those features. The SoC architecture provider 202 may need to enable or disable a feature prior to providing an SoC design to the SoC manufacturer 204, or alternatively, the SoC architecture provider 202 may need to provide to the SoC manufacturer 204 the capability of enabling or disabling certain features depending on what features are to be provided to the SoC manufacturer's customers (i.e., OEMs 206).

Figure 3A:
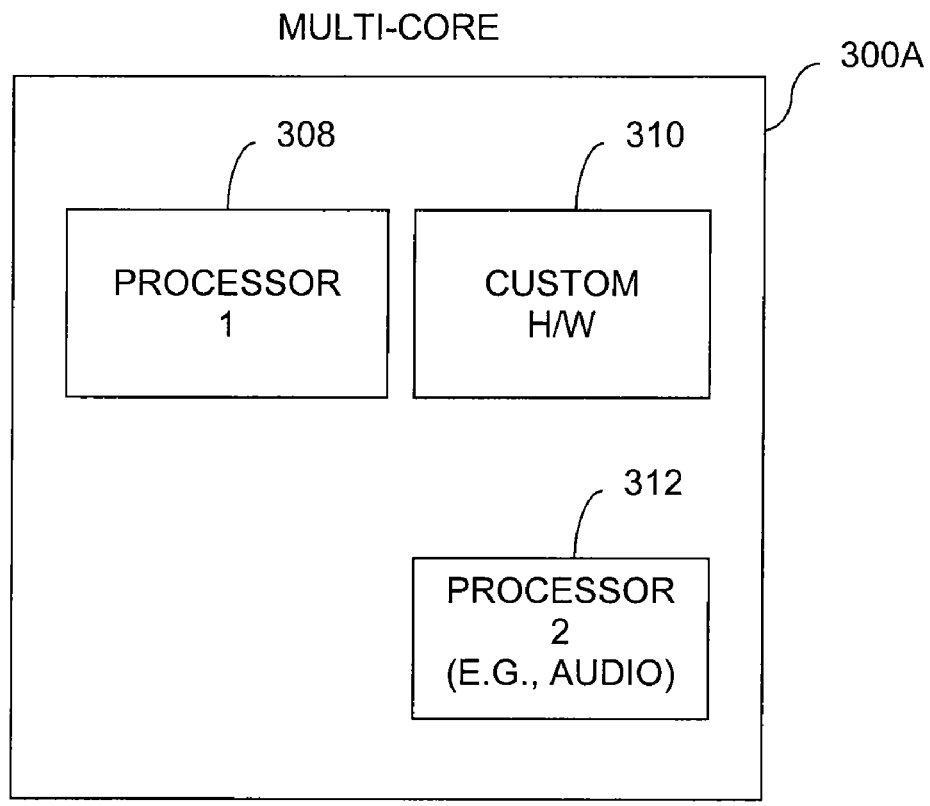
FIG. 3A is a diagram illustrating example contents of a multi-processor product according to an embodiment of the present invention.
Figure 3B:
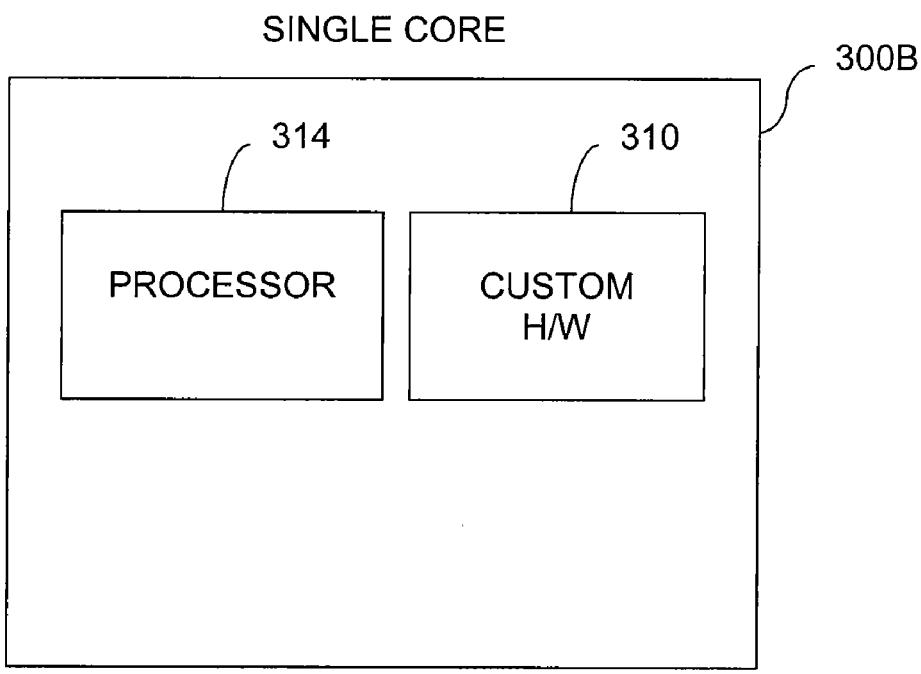
FIG. 3B is a diagram illustrating example contents of a single-processor product according to an embodiment of the present invention.

FIGS. 3A and 3B depict simplified SoCs 300A and 300B, according to embodiments of the present invention. FIG. 3A depicts a multi-processor SoC 300A. The multi-processor SoC 300A includes a first processor 308 to handle, for example, host applications, a second processor 312 to handle one or more special applications (e.g., audio), and custom hardware 310 specific to the SoC manufacturer's needs. The multi-processor SoC 300A is a single development environment with dedicated real-time performance.

FIG. 3B depicts a single processor SoC 300B. The single processor SoC 300B includes a processor 314 that can handle both host applications and one or more special applications (e.g., audio), as well as custom hardware 310. The advantages of the single processor SoC 300B include smaller die size and lower power consumption.

Figure 4:
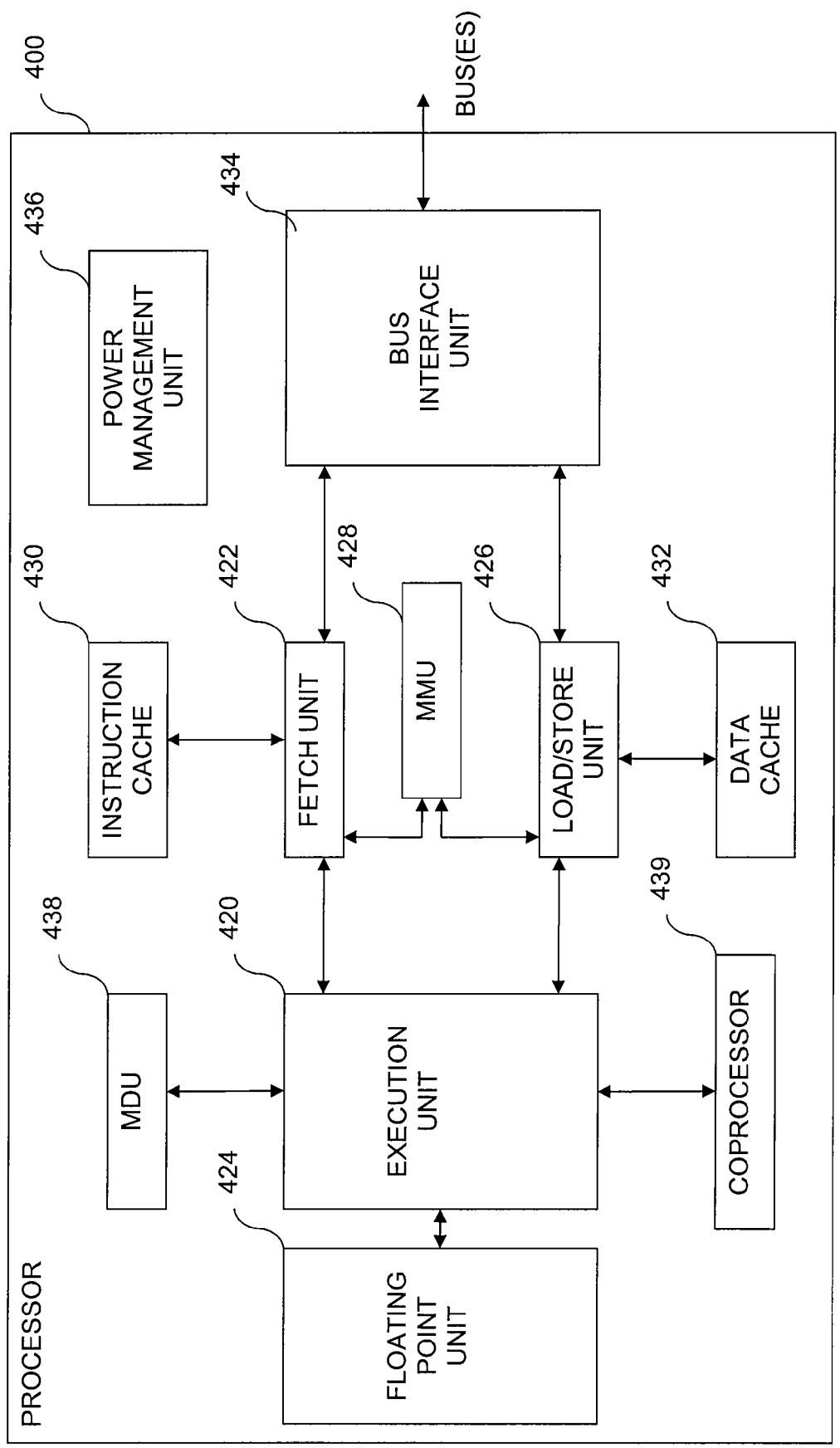
FIG. 4 is a diagram illustrating an example processor according to an embodiment of the present invention.

FIG. 4 is a diagram of a processor 400 according to an embodiment of the present invention. Processor 400 can be used, for example, as processors 308, 312, and/or 314 of FIGS. 3A and 3B. As shown in FIG. 4, processor 400 includes an execution unit 420, a fetch unit 422, a floating point unit 424, a load/store unit 426, a memory management unit (MMU) 428, an instruction cache 430, a data cache 432, a bus interface unit 434, a power management unit 436, a multiply/divide unit (MDU) 438, and a coprocessor 439. While processor 400 is described herein as including several separate components, many of these components are optional components that will not be present in each embodiment of the present invention, or components that may be combined, for example, so that the functionality of two components reside within a single component. Thus, the individual components shown in FIG. 4 are illustrative and not intended to limit the present invention.

Execution unit 420 preferably implements a load-store, Reduced Instruction Set Computer (RISC) architecture with single-cycle arithmetic logic unit operations (e.g., logical, shift, add, subtract, etc.). In one embodiment, execution unit 420 includes 32-bit general purpose registers (not shown) used for scalar integer operations and address calculations. Optionally, one or more additional register file sets can be included to minimize content switching overhead, for example, during interrupt and/or exception processing.

Execution unit 420 interfaces with fetch unit 422, floating point unit 424, load/store unit 426, multiple-divide unit 438 and coprocessor 439.

Fetch unit 422 is responsible for providing instructions to execution unit 420. In one embodiment, fetch unit 422 includes control logic for instruction cache 430, a recoder for recoding compressed format instructions, dynamic branch prediction, an instruction buffer (not shown) to decouple operation of fetch unit 422 from execution unit 420, and an interface to a scratch pad (not shown). Fetch unit 422 interfaces with execution unit 420, memory management unit 428, instruction cache 430, and bus interface unit 434.

Floating point unit 424 interfaces with execution unit 420 and operates on non-integer data. As many applications do not require the functionality of a floating point unit, this component of processor 400 need not be present in some embodiments of the present invention.

Load/store unit 426 is responsible for data loads and stores, and includes data cache control logic. Load/store unit 426 interfaces with data cache 432 and other memory such as, for example, a scratch pad and/or a fill buffer. Load/store unit 426 also interfaces with memory management unit 428 and bus interface unit 434.

Memory management unit 428 translates virtual addresses to physical addresses for memory access. In one embodiment, memory management unit 428 includes a translation lookaside buffer (TLB) and may include a separate instruction TLB and a separate data TLB. Memory management unit 428 interfaces with fetch unit 422 and load/store unit 426.

Instruction cache 430 is an on-chip memory array organized as a multi-way set associative cache such as, for example, a 2-way set associative cache or a 4-way set associative cache. Instruction cache 430 is preferably virtually indexed and physically tagged, thereby allowing virtual-to-physical address translations to occur in parallel with cache accesses. In one embodiment, the tags include a valid bit and optional parity bits in addition to physical address bits. Instruction cache 430 interfaces with fetch unit 422.

Data cache 432 is also an on-chip memory array. Data cache 432 is preferably virtually indexed and physically tagged. In one embodiment, the tags include a valid bit and optional parity bits in addition to physical address bits. In embodiments of the present invention, data cache 432 can be selectively enabled and disabled to reduce the total power consumed by processor 400. Data cache 432 interfaces with load/store unit 426.

Bus interface unit 434 controls external interface signals for processor 400. In one embodiment, bus interface unit 434 includes a collapsing write buffer used to merge write-through transactions and gather writes from uncached stores.

Power management unit 436 provides a number of power management features, including low-power design features, active power management features, and power-down modes of operation.

Multiply/divide unit 438 performs multiply and divide operations for processor 400. In one embodiment, multiply/divide unit 438 preferably includes a pipelined multiplier, result and accumulation registers, and multiply and divide state machines, as well as all the control logic required to perform, for example, multiply, multiply-add, and divide functions. As shown in FIG. 4, multiply/divide unit 438 interfaces with execution unit 420.

Coprocessor 439 performs various overhead functions for processor 400. In one embodiment, coprocessor 439 is responsible for virtual-to-physical address translations, implementing cache protocols, exception handling, operating mode selection, and enabling/disabling interrupt functions. Coprocessor 439 interfaces with execution unit 420.

Figure 5:
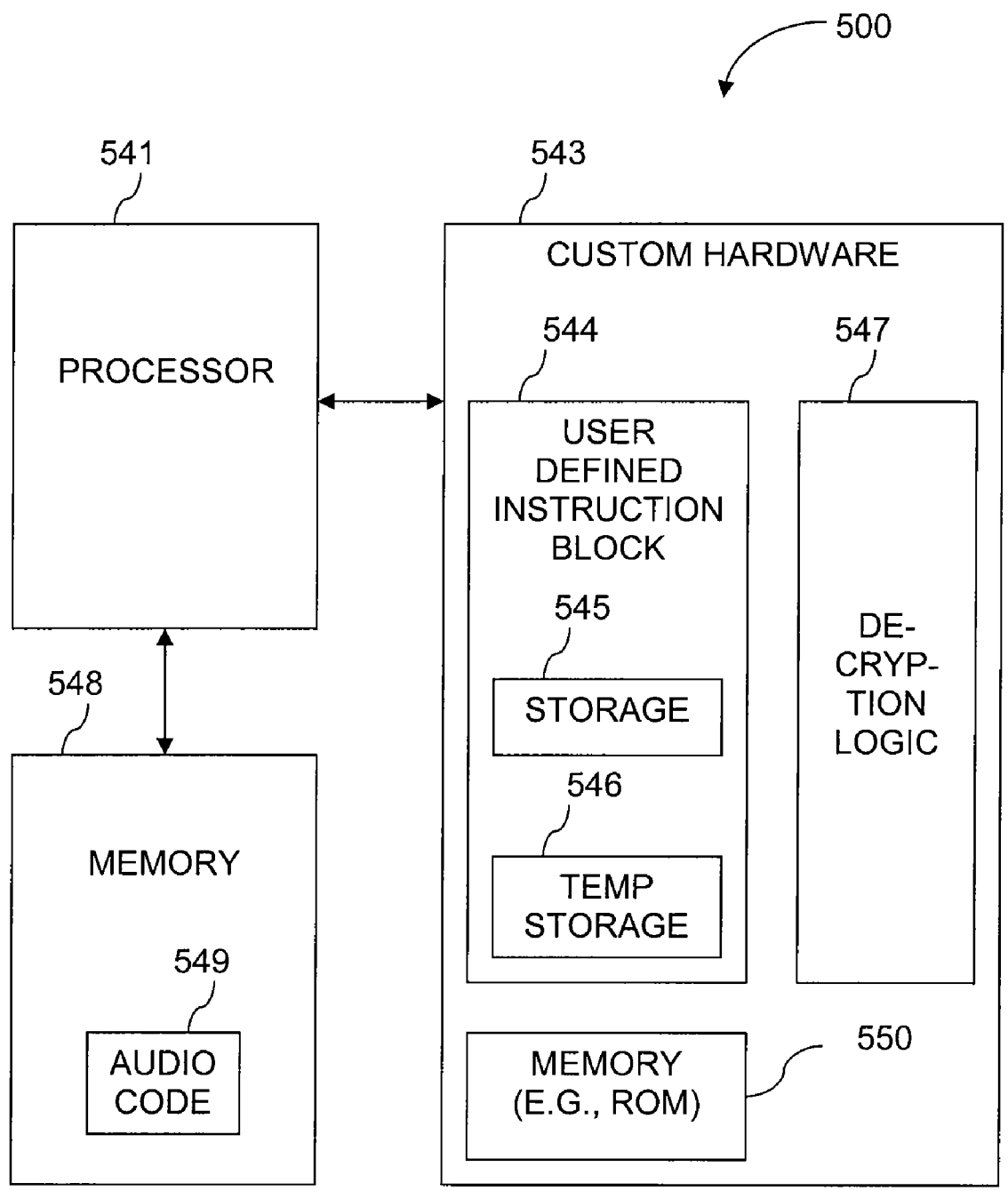
FIG. 5 is a diagram illustrating a single-processor product according to an embodiment of the invention.

FIG. 5 is a diagram illustrating a portion of a single-processor product (e.g., SoC product) 500, which is more detailed than the single-processor product shown in FIG. 3B. SoC 500 includes a processor 541, which can represent the processor described in FIG. 4, for example, a memory 548 that can contain one or more algorithms (e.g., audio code), and custom hardware 543. The processor can interface with both memory 548 and custom hardware 543. Custom hardware 543 includes a user defined instruction block 544, which includes storage 545 and temporary storage 546. Custom hardware 543 can also include memory 550 (e.g., read-only memory (ROM)). However, memory 550 can be located elsewhere (e.g., within user defined instruction block 544 or even external to custom hardware 543). Processor 541 is capable of executing user defined instructions. Custom hardware 543 can also include decryption logic 547.

According to embodiments of the present invention, when an application running on processor 541 calls an algorithm, such as audio code 549, it is necessary to first determine if use of the called algorithm is authorized. In one embodiment, an authorization value for each protected algorithm is placed into memory 550, which is ideally ROM, but can be of another type of memory. These values can be set by the SoC architecture provider, or alternatively, the SoC architecture provider can instruct an SoC manufacturer to determine a location for memory 550 and input these values. The location of memory 550 and nature of the authorization values are ideally undocumented in order to prevent an unauthorized entity (e.g., a customer of the SoC manufacturer or an end-user of a product containing the SoC) from accessing the authorization value.

Additionally, one or more validation values are placed into storage 545 of user defined instruction block 544. A validation value can be placed into storage 545 by the SoC architecture provider, or alternatively, the SoC architecture provider can instruct an SoC manufacturer to input a validation value for each associated algorithm to be enabled, for example, for a paying licensee or customer. A correct validation value is the key to authorizing use of (i.e., enabling) a called algorithm. An incorrect validation value will disable the algorithm. Similar to the authorization value, the location of storage 545 and nature of the validation value(s) are ideally undocumented in order to prevent an unauthorized entity from accessing the validation value(s).

Figure 6:
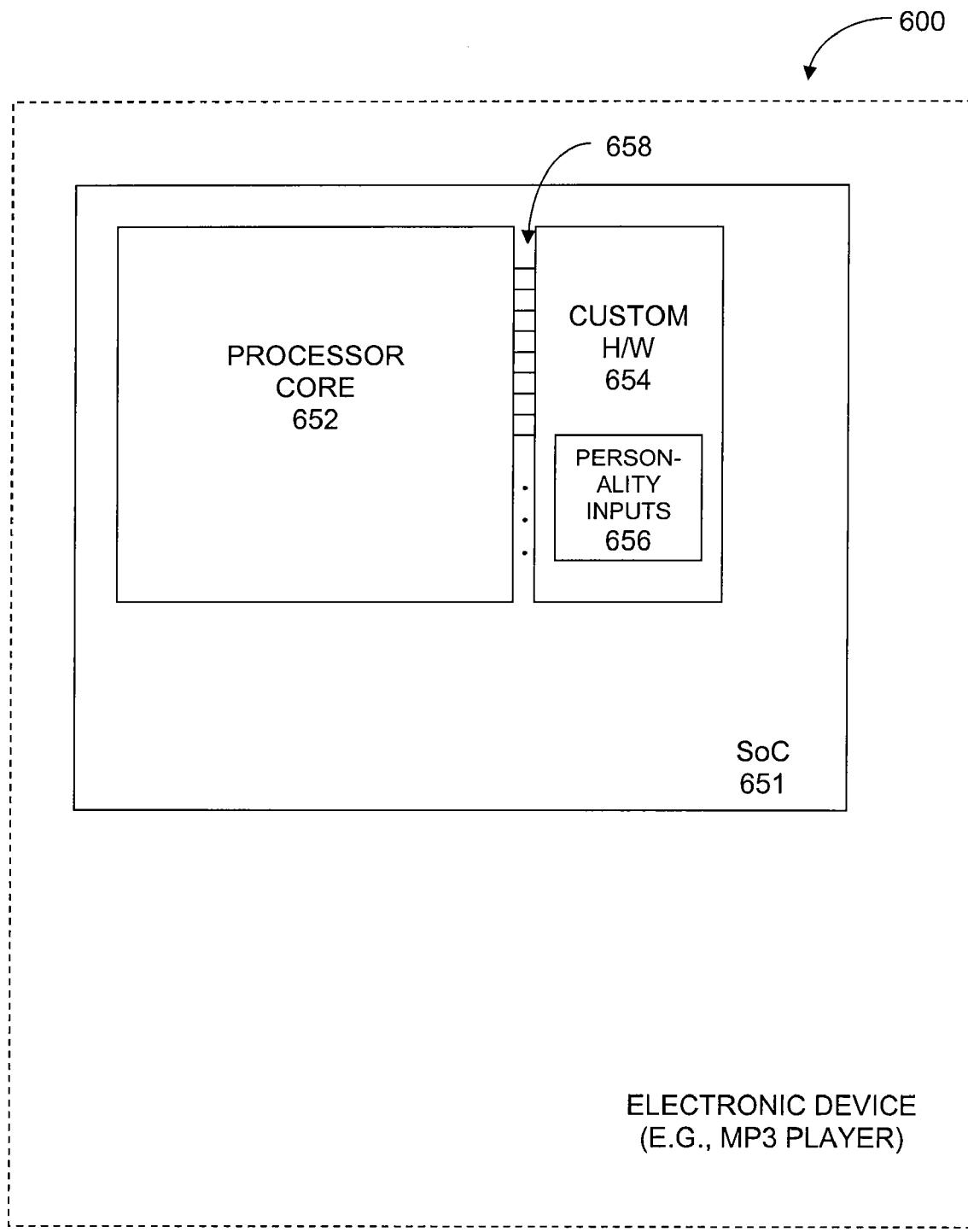
FIG. 6 is a diagram illustrating an example SoC design according to an embodiment of the present invention.

FIG. 6 shows an example of how the authorization value can be input. FIG. 6 depicts, within an electronic device 600, an SoC 651. SoC 651 includes a processor core 652 and custom hardware 654. The authorization value can be considered part of personality inputs 656 (shown within custom hardware 654) and can be input into a storage 545 (as shown within user defined instruction block 544 within custom hardware 543 of FIG. 5) using, for example, personality pins 658. The overall "personality" of a given processor core can be defined, for example, on a per customer (or licensee) basis or on a per product basis. Binaries can be provided to define the "personality" of a given processor core. In an embodiment of the present invention, the binaries could be included in unused bits of existing instructions (e.g., in an Instruction Set Architecture) to carry out an undisclosed operation to guard protected algorithms.

Referring back to FIG. 5, an embodiment of the present invention can be implemented as follows. When an application calls a protected algorithm, upon initialization of the algorithm, a user defined instruction is executed. The user defined instruction can be located, for example, within the user defined instruction block as part of a set of user defined instructions. Alternatively, the user defined instruction can be hidden within an instruction from an associated Instruction Set Architecture (ISA) or extension, or can be hidden within unused bits in existing instructions, for example.

The user defined instruction writes a temporary value into temporary storage 546. The temporary value is used to transform the validation value of storage 545. The transformation could be done in a number of ways, as would be understood by those skilled in the relevant art(s), and can include, for example, an "add," a "Boolean OR", or a more complicated computation. The transformed temporary value is compared to the authorization value located in memory 550. This can be a straight comparison, or can again involve one or more computations (e.g., an "add" or a "Boolean OR") if preferable. The called algorithm can be executed only if the comparison of the transformed temporary value to the authorization value indicates that use of the algorithm is authorized. In an embodiment, this check is also conducted during the main computation period of the algorithm, which can provide added protection if, for example, an unauthorized entity is able to bypass an algorithm's initialization. These checks not only prevent unauthorized use of an algorithm, but also prevent execution of the algorithm if it is copied and attempted to be run on any other chip because the user-defined instruction(s) will not run and will generate an exception. Similarly, removing the user-defined instruction(s) from the binary and trying to run it will fail to run the protected algorithm(s) since the user-defined instruction's local variable (the temporary value from temporary storage 546, used in the above described computation(s)) would be ignored.

In an embodiment, an authorized entity (such as an SoC architecture provider or an SoC manufacturer) can vary the validation value in order to enable or disable one or more algorithms, depending on the product requirements for a particular customer. For instance, an SoC manufacturer may have agreements to provide SoCs to one or more of its customers (e.g., OEMs). Each OEM may have different functionality requirements for its SoC. Instead of requiring a multitude of SoC designs to meet each OEM's specific needs, fewer (or even a single) SoC design incorporating many (or even all) available algorithms can be used where only the necessary functionality for each specific OEM is enabled. In order to enable an algorithm, the correct validation value needs to be placed in storage 545. In order to disable an algorithm, an incorrect validation value needs to be placed in storage 545. This can be done, for example, using the personality pins as described above with reference to FIG. 6. As stated earlier, the location and nature of the validation value(s), and optionally the authorization value(s), can be left undocumented so as to prevent unauthorized entities (e.g., OEMs or their customers) from accessing (i.e., reading, changing, etc.) the validation or authorization values, thereby preventing unauthorized entities from accessing the protected algorithm(s).

One of ordinary skill in the relevant art(s) would understand that one or more algorithms can exist that need the protection provided by the present invention. In the case of the embodiments described above, if more than one algorithm requires protection, then a single validation value/authorization value set can enable or disable one or more of the algorithms simultaneously. Or, in the alternative, multiple validation value/authorization value sets can exist, each set to control authorization for one (or more) of the protected algorithms.

Figure 7:
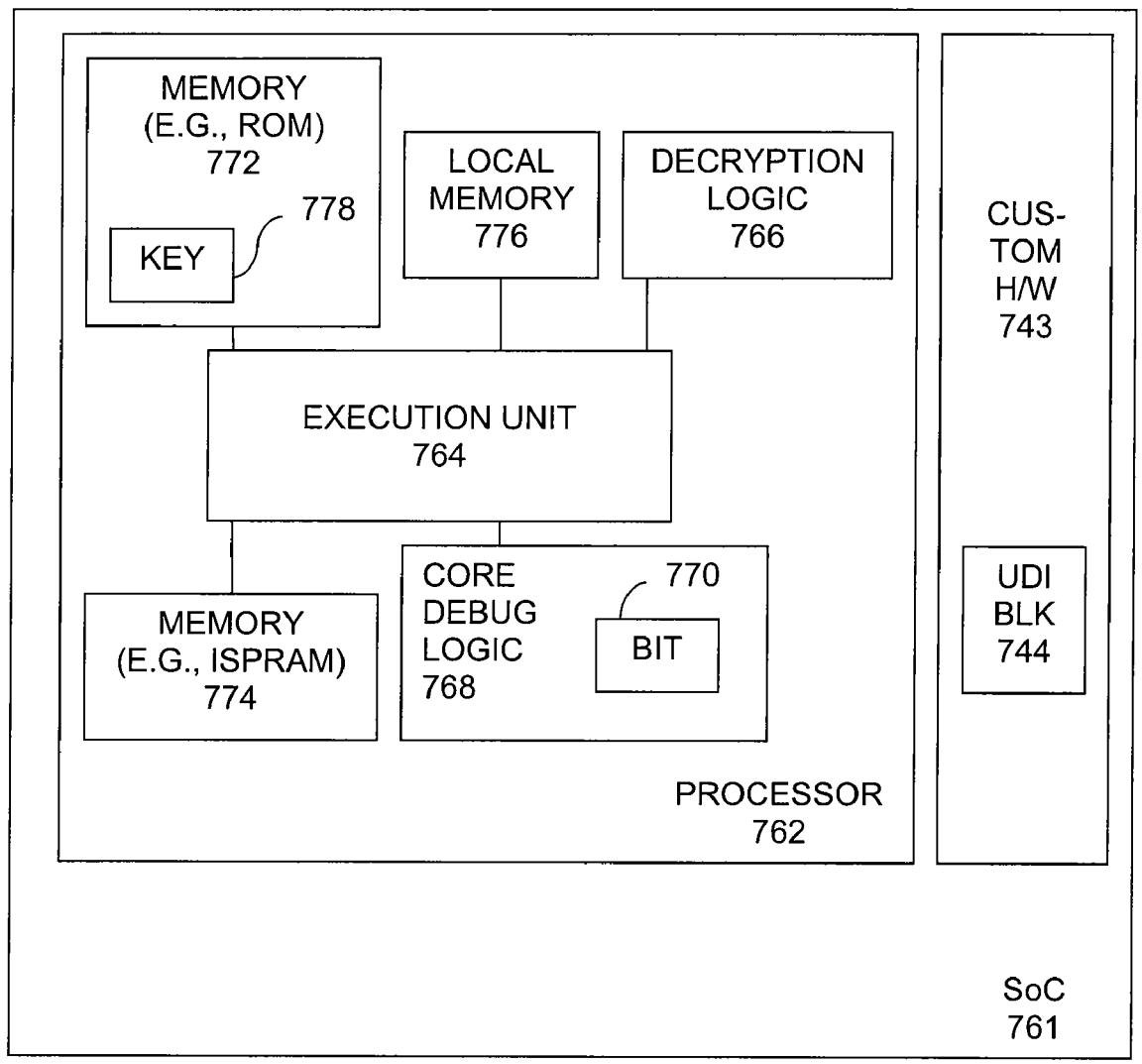
FIG. 7 is a diagram illustrating an example SoC design according to an embodiment of the present invention.

FIG. 7 is a diagram illustrating an example SoC 761 used in an embodiment of the present invention. SoC 761 includes processor 762 that is capable of executing instructions. Processor 762 includes execution unit 764, decryption logic 766, core debug logic 768 containing a bit 770, and memories 772, 774, and 776. Memory 772 includes key 778. SoC 761 can also include a custom hardware block 743 including a user defined instruction block 744 that are similar to custom hardware block 543 and user defined instruction block 544 described above with reference to FIG. 5. An embodiment of the present invention will now be described with reference to FIG. 7.

In an embodiment of the present invention, a load instruction located in a first memory location (e.g., from within memory 776) is executed. The load instruction loads an encrypted algorithm or a portion thereof (e.g., an audio algorithm or portion thereof, such as the initialization portion) from a second memory location (e.g., from within memory 776) to a third memory location (e.g., memory 774). In an embodiment, the first and second memory locations are within local memory 776 (e.g., read-access memory (RAM)). However, the first and second memory locations can be any memory location within other types of memory, as would be understood by those skilled in the relevant art(s). In an embodiment, the third memory location is Instruction Scratch Pad Read Access Memory (ISPRAM). The ISPRAM can be approximately 4 kB in size, according to one embodiment. However, other locations, types, and sizes of memory can be used. Within the third memory location, the encrypted algorithm (or portion) is decrypted using decryption logic 766 and compiled. When the decrypted algorithm (or portion) is executed, a code is checked against key 778 located within a fourth memory location (e.g., within memory 772) during the initialization of the algorithm to validate enablement of the algorithm. If enablement is validated, execution of the algorithm can continue. If enablement is not validated, execution of the algorithm is stopped. In an embodiment, this check can be done in addition to the embodiment(s) described above in reference to FIG. 5 for an additional layer of algorithm protection.

In an embodiment, the fourth memory location is read-only memory (ROM). However other memory locations and types of memory can be used, as would be understood by those skilled in the relevant art(s). The location and nature of the fourth memory location can be left undocumented in order to prevent unauthorized entities from accessing (e.g., reading, changing, etc.) the contents (e.g., the key) therein.

Core debug logic 768 disallows reading out of the third memory location (e.g., memory 774) by a debugger program. In one embodiment, core debug logic 768 includes an architectural state bit that indicates no reading out of the third memory location by a debugger is allowed. In another embodiment, core debug logic 768 includes an implementation-specific bit in a debug configuration register that indicates no reading out of the third memory location is allowed. Since the decrypted code in the third memory location cannot be read out, the algorithm code cannot be copied by a third party.

Figure 8:
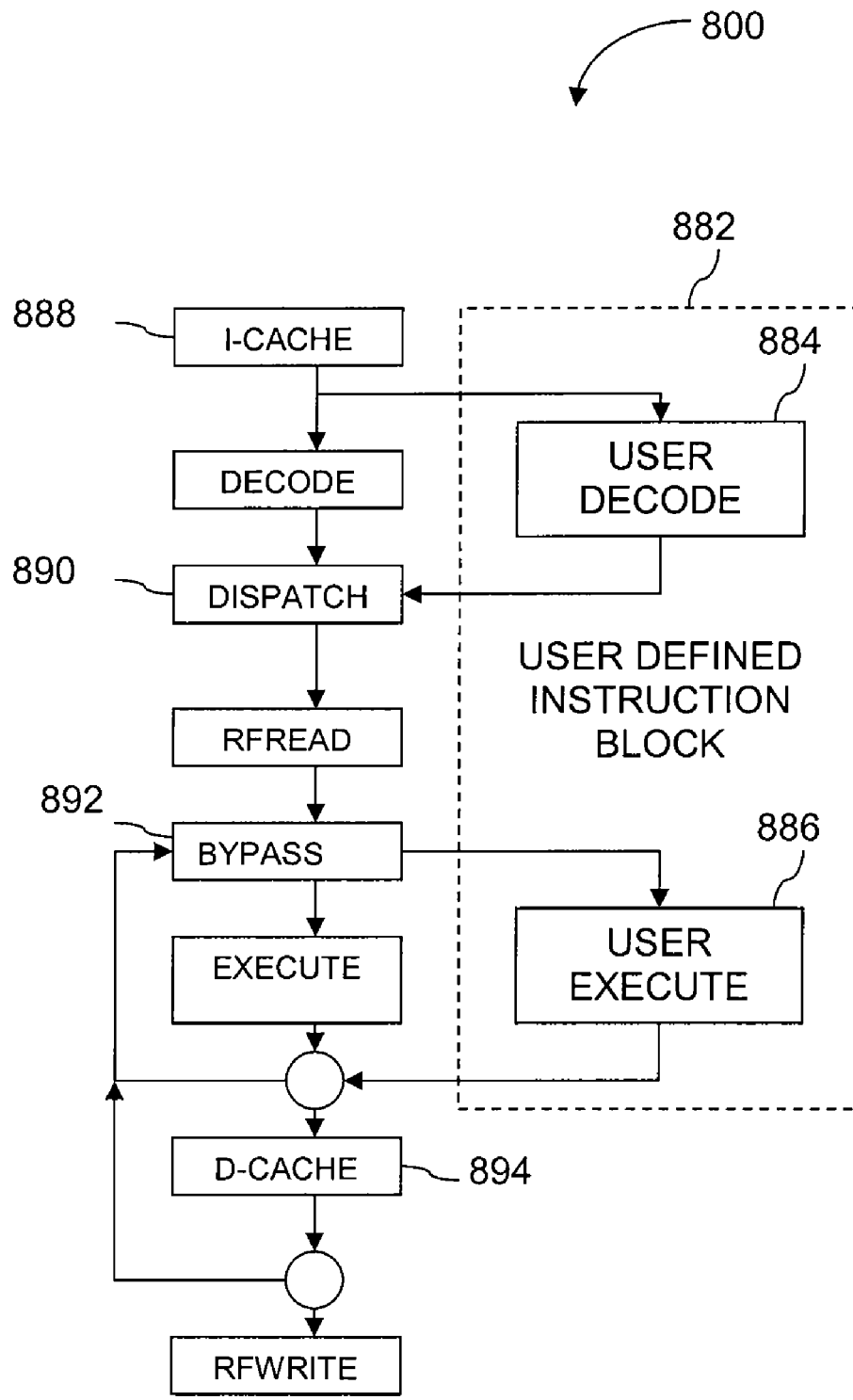
FIG. 8 is a diagram illustrating an example instruction pipeline of a processing system that includes a user defined instruction block according to an embodiment of the present invention.

FIG. 8 illustrates an example instruction pipeline 800 that includes use of a user defined instruction block 882 that can be used in accordance with embodiments of the present invention. User defined instruction block 882 includes User Decode 884 and User Execute 886. User Decode is located between I-Cache 888 and Dispatch 890, and User Execute 886 is located between Bypass 892 and D-Cache 894. Using user defined instruction block 882 allows instruction pipeline 800 to maintain compatibility with the Instruction Set Architecture (ISA) used while working with an existing software infrastructure. The user defined instruction block 882 can handle, for example, single-cycle instructions and/or multi-cycle instructions. Advantages of using user defined instruction block 882 include optimized processor headroom as well as the capability to accomplish more in a shorter time while using less power. The use of user defined instruction block 882 is supported in RTL (register transfer level) and synthesis, instruction and cycle-accurate simulators, and in industry-standard tool chains. The use of user defined instruction block 882 provides the performance of hard-wired logic with the flexibility of a programmable solution.

As discussed above, algorithms that can be protected through use of the present invention include audio algorithms. In application, such as within a digital television (DTV) system, one or more audio algorithms can be accessed through an audio interface. The audio interface can include a set of common functions and a data structure used for control and data passing. It can provide a consistent view of input and output buffers to the audio algorithms, and the input and output buffers can be shared among multiple cascading algorithms, which helps avoid the overhead of buffer copying.

Figure 9:
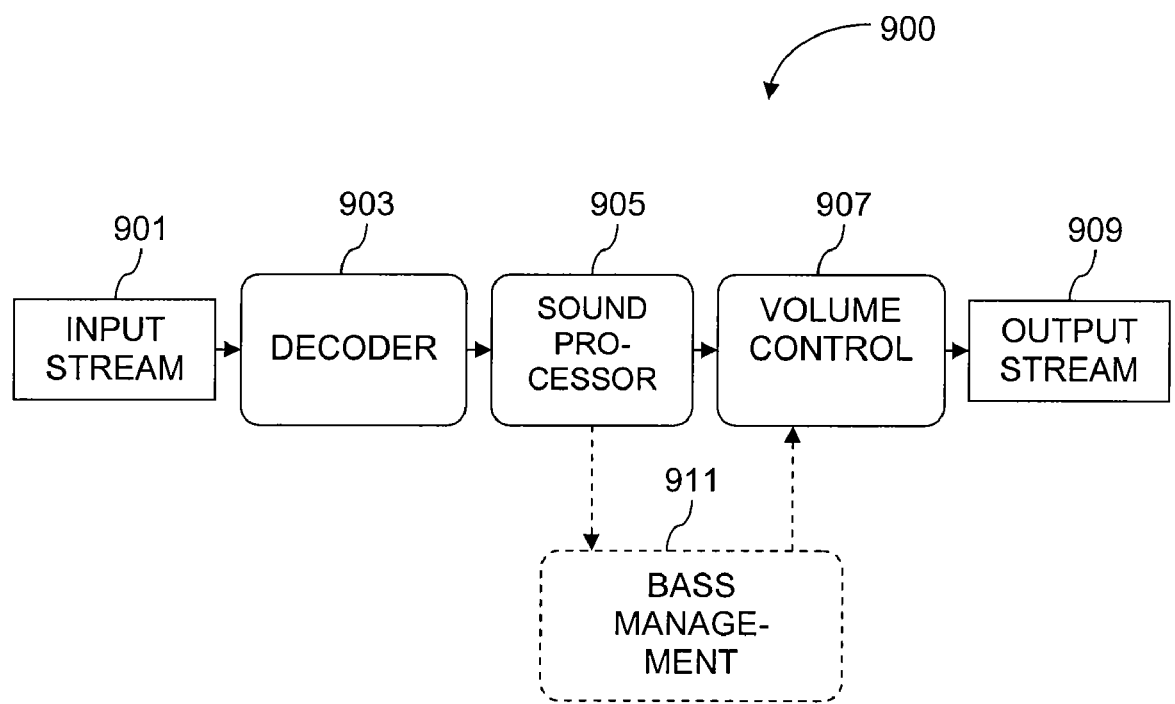
FIG. 9 is a diagram illustrating an example audio interface according to an embodiment of the present invention.

In an application, such as the DTV example 900 shown in FIG. 9, the audio interface of the present invention can be used to simplify the cascading of algorithms. As shown in FIG. 9, a decoder 903 (such as a Dolby® Digital decoder) decodes an input stream 901 of audio signal data from a calling application (not shown). The decoder 903 passes decoded audio data to a sound processor 905 (such as SRS Labs' TruSurround XT® (SRS TSXT)) for processing. Processed audio data then gets passed to volume control 907 and exits as output stream 909 back to the calling application (not shown). Optionally, bass management 911 of the processed audio data can occur.

Figure 10:
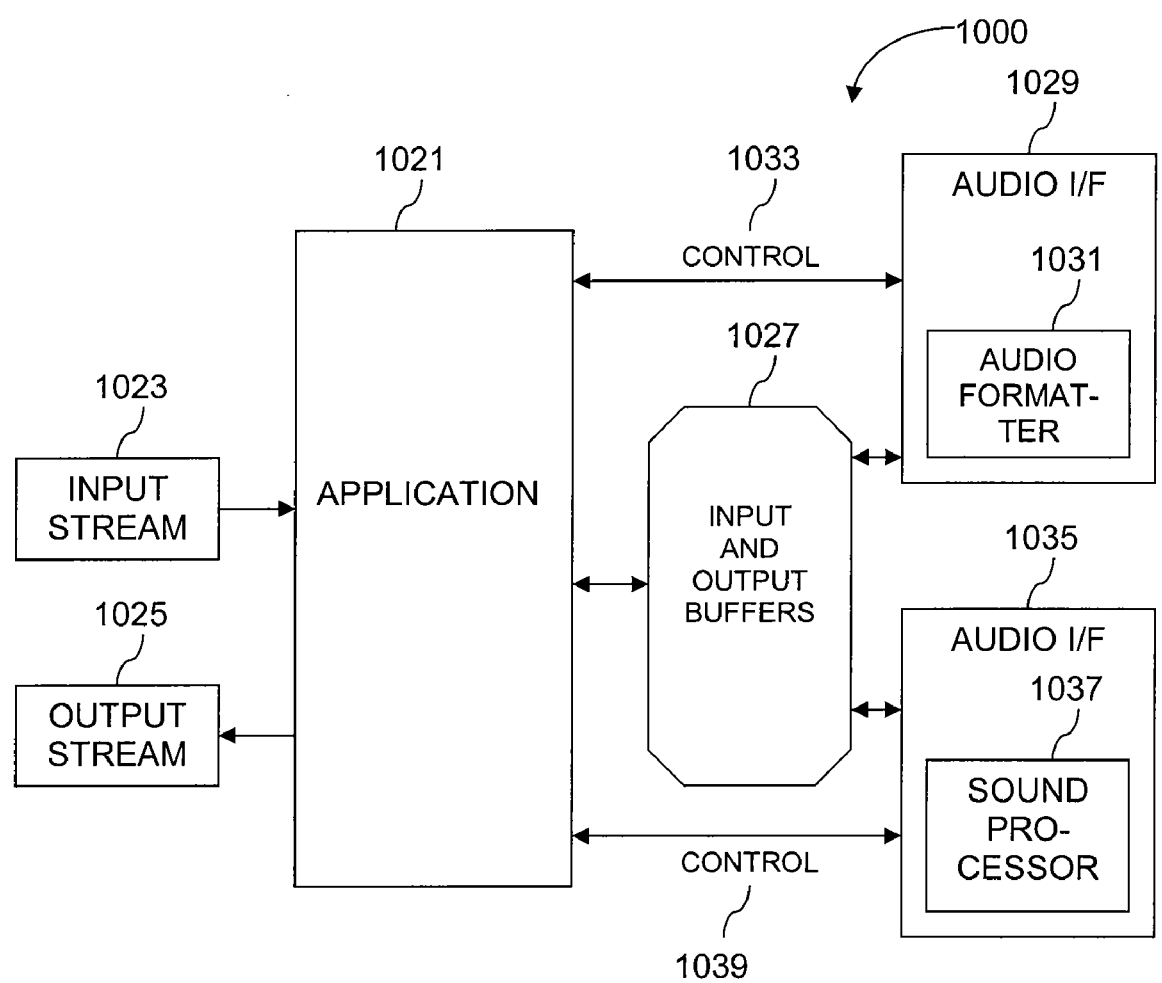
FIG. 10 is a diagram illustrating an example of cascading algorithms according to an embodiment of the present invention.

FIG. 10 shows another example 1000 of cascading audio algorithms using an audio interface. An application 1021 receives an input data stream 1023 and passes audio data through input/output buffers 1027 to audio interface(s) 1029 and 1035 for processing by an audio data formatter 1031 (e.g., to format the data to/from Double Density Compact Disk (DDCD) format) and a sound processor 1037 (e.g., SRS Labs' TruSurround XT® (SRS TSXT)), respectively. Application 1021 provides control information 1033 and 1039 to the audio interface(s) to control the data processing. Processed data is passed back through input/output buffers 1027 to application 1021, and exits as output stream 1025. In this example, two audio algorithms are shown (audio data formatter 1031 and sound processor 1037). However, even though these two algorithms exist in this example system, it might be that the OEM product containing these algorithms is not authorized to use one or both of the algorithms. In that case, the present invention can be used to disable one or both of the algorithms.

Figure 11:
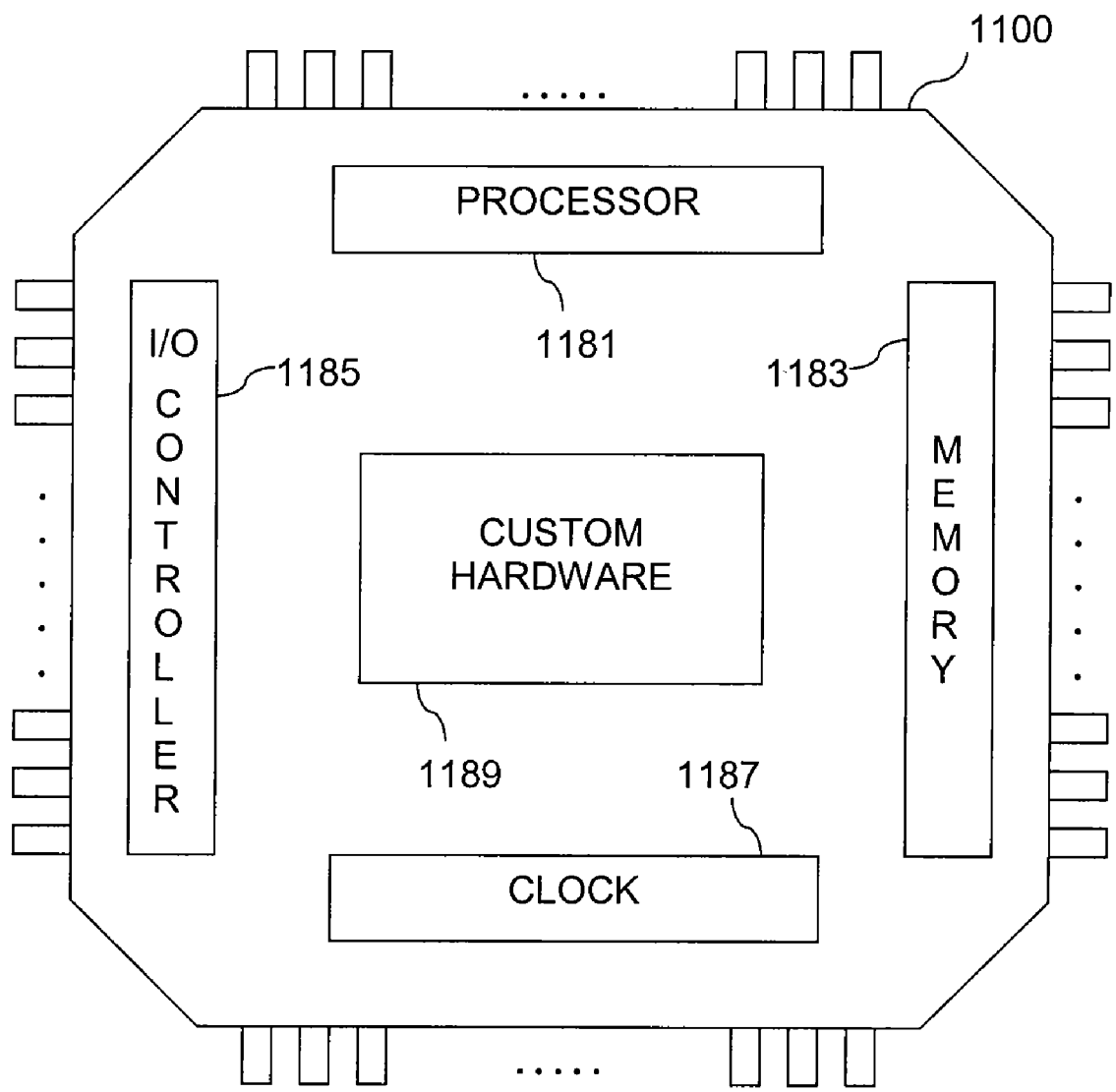
FIG. 11 is a diagram illustrating an example SoC according to an embodiment of the present invention.

FIG. 11 is a diagram of an example system 1100 according to an embodiment of the present invention. System 1100 includes a processor 1181, a memory 1183, and custom hardware 1189, that could represent processor 541, memory 548, and custom hardware 543 of FIG. 5, respectively, for example, according to an embodiment of the invention. System 1100 also includes an input/output (I/O) controller 1185 and a clock 1187. In an embodiment, system 1100 is a system on a chip (SoC) in an application specific integrated circuit (ASIC).

Processor 1181 is any processor that includes features of the present invention described herein and/or implements a method embodiment of the present invention. In one embodiment, processor 1181 includes an instruction fetch unit, an instruction cache, an instruction decode and dispatch unit, one or more instruction execution unit(s), a data cache, a register file, and a bus interface unit similar to processor 400 described above.

Memory 1183 can be any memory capable of storing instructions and/or data. Memory 1183 can include, for example, random access memory and/or read-only memory.

Input/output (I/O) controller 1185 is used to enable components of system 1100 to receive and/or send information to peripheral devices. I/O controller 1185 can include, for example, an analog-to-digital converter and/or a digital-to-analog converter.

Clock 1187 is used to determine when sequential subsystems of system 1100 change state. For example, each time a clock signal of clock 1187 ticks, state registers of system 1100 capture signals generated by combinatorial logic. In an embodiment, the clock signal of clock 1187 can be varied. The clock signal can also be divided, for example, before it is provided to selected components of system 1100.

Custom hardware 1189 is any hardware added to system 1100 to tailor system 1100 to a specific application. Custom hardware 1189 can include, for example, hardware needed to decode audio and/or video signals, accelerate graphics operations, and/or implement a smart sensor. Persons skilled in the relevant arts will understand how to implement custom hardware 1189 to tailor system 1100 to a specific application.

Figure 12:
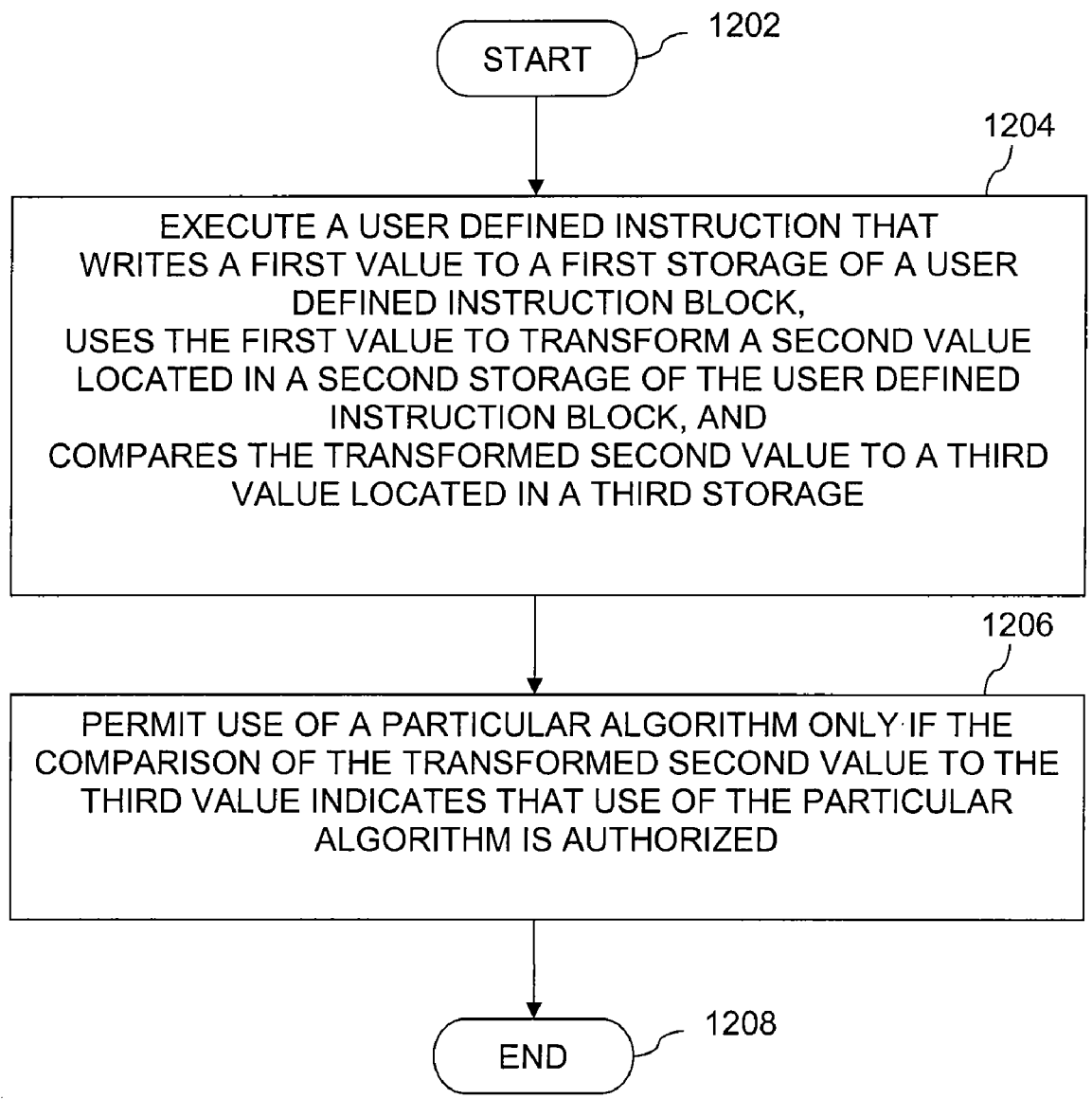
FIG. 12 is a flowchart illustrating a method of algorithm processing according to an embodiment of the present invention.

FIG. 12 illustrates a method 1200 of algorithm processing, according to an embodiment of the present invention. Method 1200 begins at step 1202. In step 1204, at least one user defined instruction is executed using a processor capable of executing user defined instructions, as discussed above. As a result, a first value is written to a first storage of a user defined instruction block (e.g., temporary storage 546). The first value is used to transform a second value located in the user defined instruction block (e.g., a validation value located in storage 545 of FIG. 5). The transformed second value is compared to a third value located in a third storage (e.g., an authorization value located in memory 550 of FIG. 5). The at least one user defined instruction can be executed upon initialization of an algorithm or during the main computation period of the algorithm. For added protection, the at least one user defined instruction can be executed both upon initialization of the algorithm and during the main computation period of the algorithm. In step 1206, use of the algorithm is permitted only if the comparison of the transformed second value to the third value indicates that use of the algorithm is authorized. The method ends at step 1208.

In an embodiment, the second value can be varied prior to executing the first instruction in order to change the authorization (e.g., enable or disable) for use of the algorithm. In another embodiment, an authorized entity can input the third value into the third storage and leave the third storage undocumented in order to prevent unauthorized entities from accessing the third value. In fact, the locations of one or both of the first storage and the second storage can be left undocumented to prevent unauthorized entities from accessing (e.g., reading, changing, etc.) the contents therein.

Figure 13:
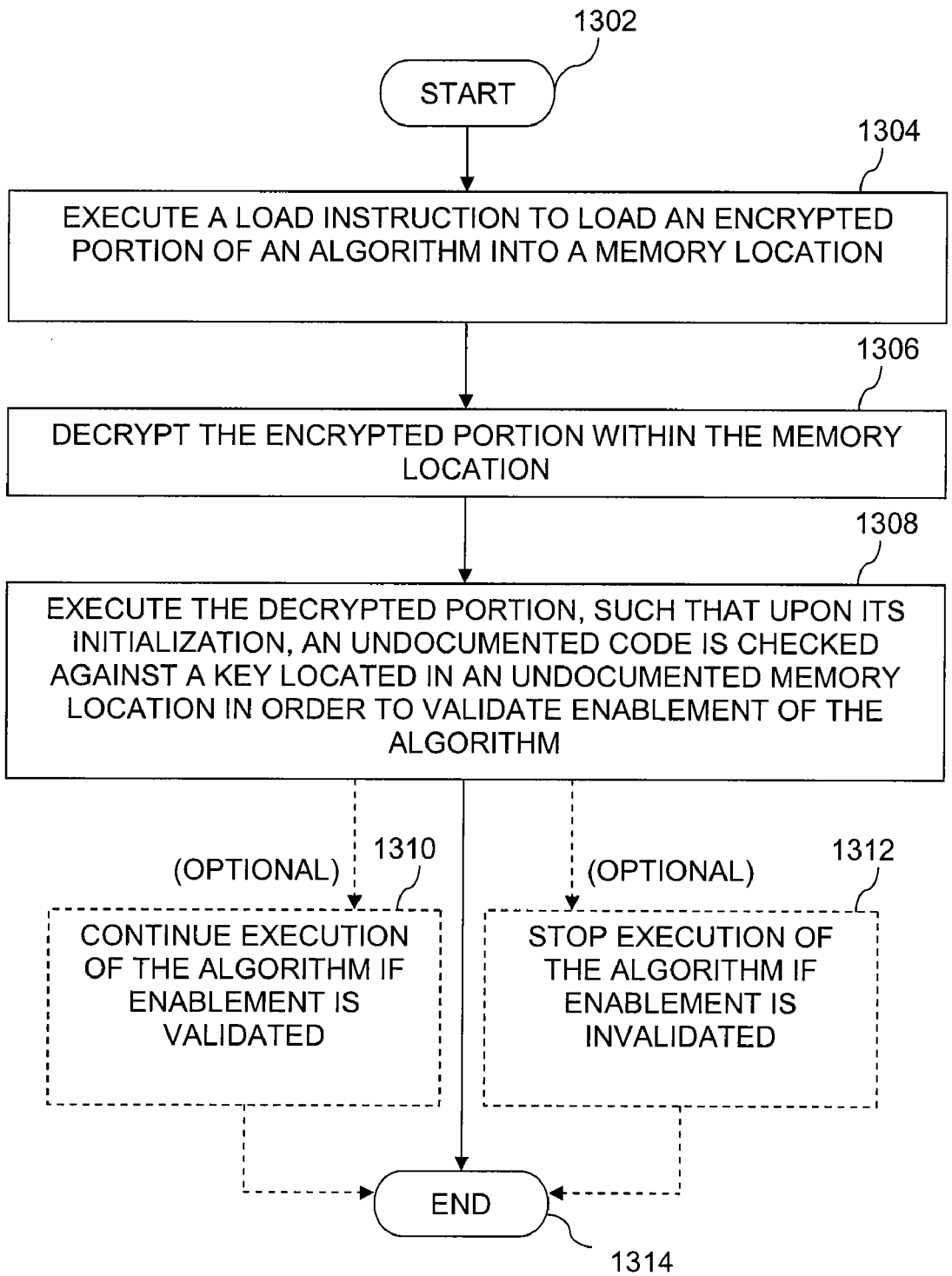
FIG. 13 is a flowchart illustrating a method for validating authorization to use an algorithm according to embodiments of the present invention.

FIG. 13 illustrates a method 1300 for validating authorization to use an algorithm, according to an embodiment of the present invention. Method 1300 begins at step 1302. In step 1304, at least one instruction is executed to load an encrypted portion of an algorithm (e.g., an audio or video algorithm) into a memory location (e.g., memory 774 of FIG. 7, ideally ISPRAM) using a processor capable of executing user defined instructions. In step 1306, the encrypted portion of the algorithm is decrypted within the second memory location (e.g., using decryption logic 766 of FIG. 7). In step 1308, the decrypted portion of the algorithm is executed. Upon execution of the decrypted portion, an undocumented code is checked against a key located in an undocumented memory location (e.g., key 778 located in memory 772 (ideally ROM) of FIG. 7) in order to validate enablement of the algorithm. In an embodiment, if enablement is validated, execution of the algorithm can continue in step 1310. If enablement is invalidated, execution of the algorithm is stopped in step 1312. Method 1300 ends at step 1314.

In one embodiment, the system is configured such that reading out of the memory location (e.g., memory 774 of FIG. 7) by a debugger is not allowed. A bit (e.g., bit 770) within core debug logic 768 can accomplish this. For example, bit 770 can be an architectural state bit that indicates no reading out of the memory location by a debugger is allowed. In another embodiment, bit 770 can be an implementation-specific bit in a debug configuration register that indicates no reading out of the memory location by a debugger is allowed. Method 1300 can be used alone or in conjunction with method 1200 for an additional level of algorithm protection.

Figure 14:
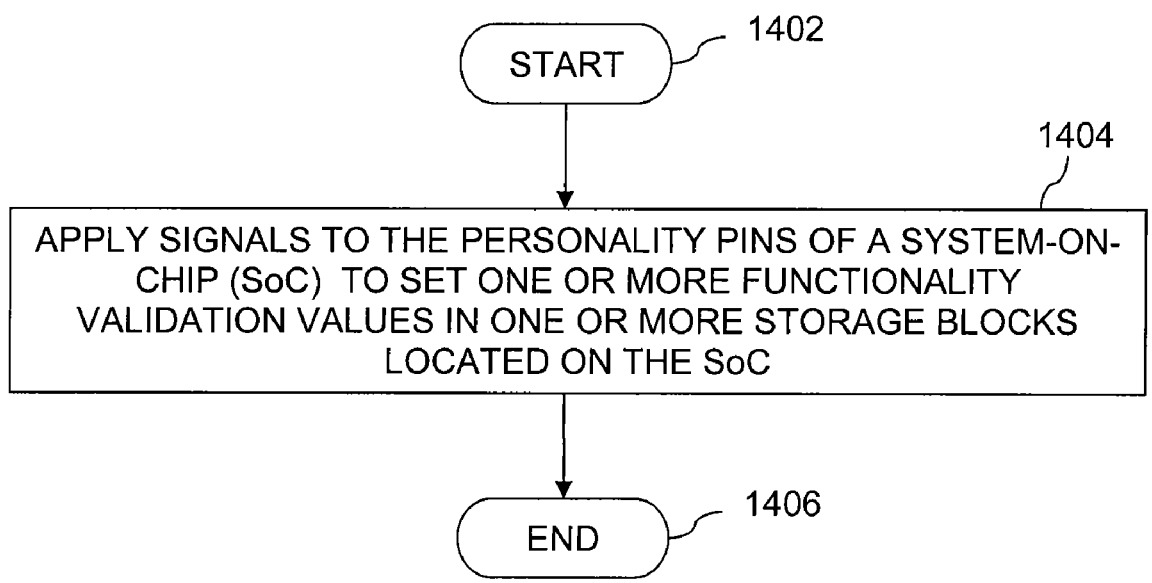
FIG. 14 is a flowchart illustrating a method for selectively enabling functionality requirements in a system-on-chip (SoC) according to an embodiment of the present invention.

FIG. 14 is a flowchart illustrating a method 1400 for selectively enabling functionality requirements according to an embodiment of the present invention. In application, an SoC manufacturer can use this method to enable or disable one or more protected algorithms, for example, depending on the needs of its SoC customers. Method 1400 begins at step 1402. In step 1404, signals are applied to personality pins of an SoC to set one or more functionality validation values in one or more storage blocks located on the SoC. After the functionality validation values are set, when a protected algorithm is called, an instruction is executed that transforms the functionality validation value that corresponds to that protected algorithm and compares the transformed functionality validation value to an authorization value. Use of that protected algorithm is permitted only if the comparison of the transformed functionality validation value to the authorization value indicates that use of the protected algorithm is authorized. In step 1404, the signals that would enable one or more protected algorithms can be provided to an SoC manufacturer by an SoC architecture provider, for example. Alternatively, the SoC manufacturer can determine what signals enable the protected algorithms. With this alternative, the SoC manufacturer would also set the one or more authorization values that correspond to the functionality validation values. Method 1400 ends at step 1406.

While various embodiments of the present invention have been described above, it should be understood that they have been presented by way of example, and not limitation. It will be apparent to persons skilled in the relevant computer arts that various changes can be made therein without departing from the scope of the invention. For example, the features of the present invention can be selectively implement as design features. Furthermore, it should be appreciated that the detailed description of the present invention provided herein, and not the summary and abstract sections, is intended to be used to interpret the claims. The summary and abstract sections may set forth one or more but not all exemplary embodiments of the present invention as contemplated by the inventors.

For example, in addition to implementations using hardware (e.g., within or coupled to a Central Processing Unit ("CPU"), microprocessor, microcontroller, digital signal processor, processor core, system-on-chip ("SoC"), or any other programmable or electronic device), implementations may also be embodied in software (e.g., computer readable code, program code and/or instructions disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), hardware description languages (HDL) including Verilog HDL, VHDL, SystemC Register Transfer Level (RTL) and so on, or other available programs, databases, and/or circuit (i.e., schematic) capture tools. Such software can be disposed in any known computer usable medium including semiconductor, magnetic disk, optical disk (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets.

It is understood that the apparatus and method embodiments described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalence.

What is claimed is:

1. In a microprocessor having a protected function, a method for selectively enabling the protected function for a user, the method comprising:
   receiving, from the user, at the microprocessor, a user defined instruction, wherein the user defined instruction is created by the user;
   receiving a validation value from the user, wherein the validation value is unprotected from the user;
   storing the received user defined instruction in a storage in the microprocessor;
   executing, by the microprocessor, the stored user defined instruction, wherein the user defined instruction directs the microprocessor to enable the protected function based on an authorization value protected from the user and the validation value; and
   allowing the validation value to be varied prior to executing the stored user defined instruction in order to change the authorization for use of the protected function.

2. The method of claim 1, wherein enabling the protected function includes enabling a protected audio algorithm.

3. The method of claim 1, wherein executing the stored user defined instruction comprises, when a request is received to use a main computation period of the protected function, executing the user defined instruction.

4. A non-transitory computer readable storage medium having computer executable instructions stored thereon that, when executed by a microprocessor, cause the microprocessor to perform operations for selectively enabling a protected function for a user, the operations comprising:
   receiving, from the user, at the microprocessor, a user defined instruction, wherein the user defined instruction is created by the user;
   receiving a validation value from the user, wherein the validation value is unprotected from the user;
   storing the received user defined instruction in a storage in the microprocessor;
   executing, by the microprocessor, the stored user defined instruction, wherein the user defined instruction directs the microprocessor to enable the protected function based on an authorization value protected from the user and the validation value; and allowing the validation value to be varied prior to executing the stored user defined instruction in order to change the authorization for use of the protected function.

5. A method for processing in a system having a processor with a protected algorithm and executing user defined instructions, the method comprising:

receiving, from a user, at the processor, a user defined instruction, wherein the user defined instruction is created by the user;

receiving a validation value from the user, wherein the validation value is unprotected from the user;

storing the received user defined instruction in a storage in the processor;

executing, by the processor, the stored user defined instruction, wherein the user defined instruction directs the processor to enable the protected algorithm based on an authorization value protected from the user and the validation value; and allowing the validation value to be varied prior to executing the stored user defined instruction in order to change the authorization for use of the protected algorithm.

6. The method of claim 5, wherein enabling the protected algorithm includes enabling a protected audio algorithm.

7. The method of claim 5, wherein executing the user defined instruction occurs during initialization of the protected algorithm.

8. The method of claim 5, wherein executing the stored user defined instruction comprises, when a request is received to use a main computation period of the protected algorithm, executing the user defined instruction.

9. The method of claim 1, wherein executing the user defined instruction occurs during initialization of the protected function.

10. A system for selectively enabling in a microprocessor a protected function for a user comprising:

a user defined instruction block configured to:
receive a user defined instruction from the user, wherein the user defined instruction is created by the user, and store the received user defined instruction; and a storage module configured to receive a validation value from the user, wherein the validation value is unprotected from the user, wherein the microprocessor is configured to:
execute the stored user defined instruction to enable the protected function based on an authorization value protected from the user and the validation value, and
allow the validation value is to be varied prior to executing the stored user defined instruction in order to change the authorization for use of the protected algorithm.

* * * * *